INVENTOR
P. W. Mossey
BY Harry A. Herbert Jr
ATTORNEY

United States Patent Office

3,475,961
Patented Nov. 4, 1969

3,475,961
PROBE FOR TESTING SUPERSONIC GASES
Paul W. Mossey, Cincinnati, Ohio, assignor to the United States of America as represented by the Secretary of the Air Force
Filed Oct. 24, 1967, Ser. No. 677,804
Int. Cl. G01k 1/08, 3/00, 11/00
U.S. Cl. 73—343                                   4 Claims

ABSTRACT OF THE DISCLOSURE

A probe measures the temperature at a point in a high speed gas stream. The design of the probe causes a minimum disturbance on the free stream static temperature by having a wedge shaped head which isolates a segment of the gas stream and generates external oblique shock waves which do not significantly interfere with the free flow of the isolated gas segment.

BACKGROUND OF THE INVENTION

Field of the invention

The present invention pertains generally to an improvement in gas stream probes, and more particularly to those probes which are used for measuring gas temperatures when the relative velocity of the gas to the probe may vary from zero velocity to supersonic velocity. Generally, the probe dimensions are smaller than the limits of the gas stream and, thus, the probe will be completely immersible in the gas stream to effect a local or point temperature measurement in the gas stream.

Description of the prior art

Prior art methods and apparatus for the measurement of temperatures of supersonic gases have included simple optical techniques and probes. Optical techniques such as sodium line reversal have been used to measure an average static gas temperature across the entire gas stream by using remote optical apparatus. These measurements have been unsatisfactory in determining a local or point temperature within the gas stream because the gas stream temperature gradient often lacks symmetry and because the average gas stream temperature has an extremely non-linear relationship to the local or point temperatures.

Sampling probes have also been used in the measurement of gas temperatures and these devices have usually included a temperature sensor such as a thermocouple or a thermistor. Accurate measurements have been made with such temperature sensors when the gas streams were of low velocity and moderate temperature. However, with high velocity (above Mach 1) and high temperatures (above 4000° Rankine), the performance of such temperature sensor type probes has been unsatisfactory because of errors produced by frictional heating and/or by compression of the air as it is brought to rest against the temperature sensor. Furthermore, shock wave phenomena and the relative low melting point of known temperature sensor materials have imposed further limitations on prior art gas temperature probes. These problems and limitations inherent in such prior art supersonic gas testing systems have been solved by utilizing miniature sodium line reversal optics within a novel gas probe which is designed to have a minimum disturbance on the free stream static temperature. Such a probe will permit accurate measurements to be made at any point in the gas stream.

SUMMARY OF THE INVENTION

In the gas temperature probe of the present invention, two wedge shaped elements which contain the optical apparatus are positioned to form a stream path therebetween. The probe is placed in the gas stream at a point where the temperature is to be measured. The wedges slice off a segment of the gas stream and the optical measurement is performed as the sliced segment flows between the two wedges. After the isolated gas sample passes the optical measurement point, it is diverted out of the probe by a third wedge shaped element. The probe of the present invention permits the measurement of a local static temperature within a supersonic gas stream having any temperature gradient and with no interference from the gas flow outside of the measured zone.

DESCRIPTION OF THE PREFERRED EMBODIMENT

Figure 1:
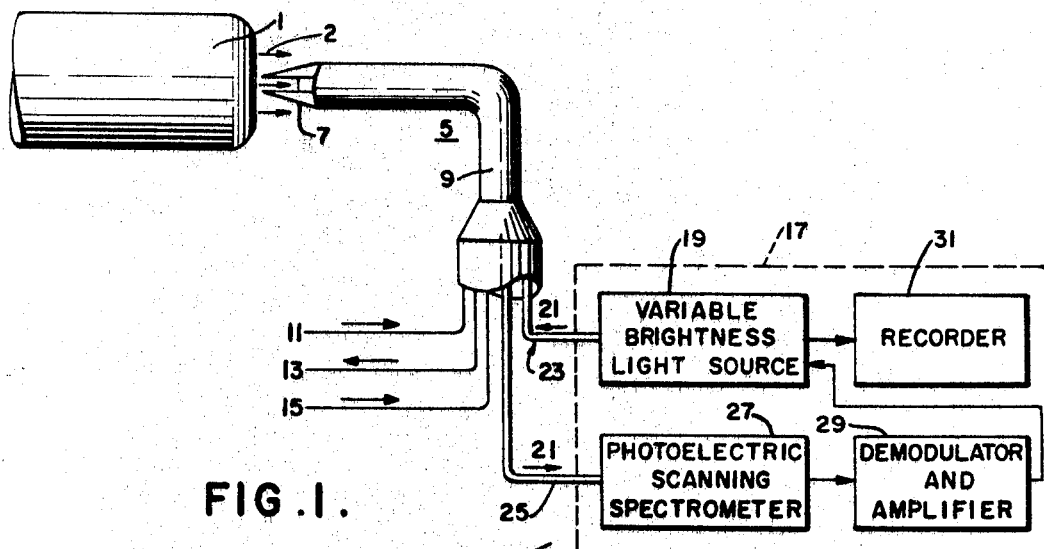
FIGURE 1 is a schematic of the complete measurement system.

Referring to FIGURE 1, the complete measuring system is shown as it would be used to measure the static temperature at a point in the exit plane of a supersonic combustor. The nozzle or combustor 1 supplies a high velocity, high temperature gas jet or stream 2 which has been appropriately seeded with sodium. The optical probe 5 is placed in the gas stream 2 and the probe head 7 is positioned at the point in the gas stream where the temperature measurement is desired. The probe support 9 houses conduits 11, 13, and 15 which convey a coolant to and from the probe head. The electronics of the sodium line reversal measuring system is shown generally at 17. It comprises a spectrometer 27, a demodulator and an amplifier 29, a variable brightness light source 19, and a recorder 31.

Figure 2:
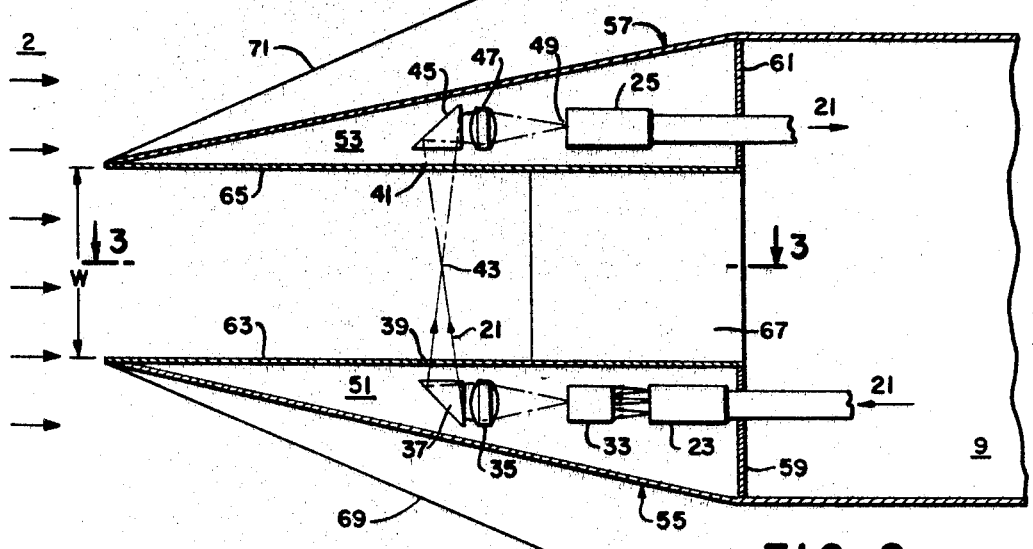
FIGURE 2 is a cross sectional of the probe head.

FIGURE 2 is a cross-section of the probe head 7 which includes the optics of the measuring system. The probe head preferably comprises two right angle wedge shaped members 51 and 53 which are attached at their short bases 59 and 61 to the probe support 9. The cooling conduits 11, 13, and 15 also extend into the wedges but are not shown for purposes of clarity. A third wedge shaped member 76, preferably having two inclined sides 73 and 75 and a base 77, is attached to the probe support 9 so that the inclined sides 73 and 75 of wedge 67 are perpendicular to long bases 63 and 65 of right angle wedge shaped members 51 and 53; the base 77 of wedge shaped member 67 is attached to probe support 9. The wedge shaped member 67 is preferably isosceles with the inclined sides 73 and 75 forming equal angles with respect to the base 77.

The optical measuring elements in the wedge shaped members comprise a fiber optic light carrier 23 which transmits light from the light source 19 to the wedge shaped member 51; a diffuser 33 which provides a more uniform source of light than the carrier 23; and a lens 35 and a prism 37 which focus the light 21 from the diffuser through a porthole or window 39 and into the gas stream at point 43. The light 21 then passes through a porthole or window 41 into the wedge 53. A prism 45 and a lens 47 image this light onto the face of optic light carrier 25 which transmits it to the spectrometer 27. The demodulator and amplifier 29 keep the brightness of light source 19 matched to the flame static temperature as is done in the conventional sodium line reversal setup. A recorder 31 records the brightness which can later be converted to temperature.

In operation, the optical probe 5 is inserted into the gas stream 2 and the probe head 7 is positioned at the point in the gas stream where the temperature measurement is desired. The two right angle wedge shaped members 51 and 53 isolate a segment W of the gas stream 2. this isolated segment W of the gas stream flows along the passageway between wedge shaped members 51 and 53 and passes into the light beam 21 where the temperature measurement is made. After the measurement is made, the gas sample flows against the inclined sides 73 and 75 of the third wedge shaped member 67 and is diverted out of the probe head.

Figure 3:
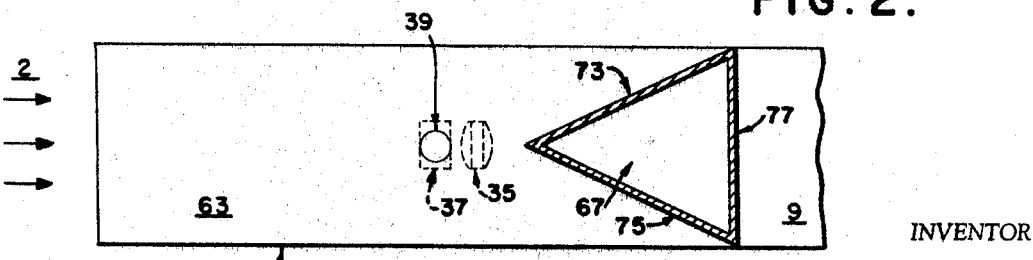
FIGURE 3 is a sectional taken on line 3—3 of FIGURE 2.

FIGURE 3 is a sectional view taken along the line 3—3 in FIGURE 2. It illustrates the shape of wedge member 67 which diverts the isolated segment of gas out of the probe head 7. The wedge shaped member 67 comprices a flat base 77 which abuts probe support 9 and two inclined sides 73 and 75.

The probe design of the present invention permits measurement of the average temperature across the isolated segment W of the gas stream; because the separation W between the wedges 51 and 53 can be made smaller than the width of most gas streams, the average temperature across the segment W of the gas stream will more accurately represent the local temperature at point 43 than would an optical measuring system across the entire gas stream, and in most cases it will be heavily weighted toward the peak temperature at point 43. Furthermore, with the probe design of the persent invention, the frictional heat generated in the boundary layer is conducted away through the cool walls of the wedge shaped members. Also, the wedge shaped members 51 and 53 generate external oblique shock waves 69 and 71 which do not interfere with the sliced gas flow.

The above description is based on the sodium line reversal technique for the measurement of the temperature. However, the identical probe head and optics can be used for a conventional absorption-emission technique, using any appropriate seeding material or making use of the stream constituents when available.

I claim:
1. A supersonic gas probe comprising:
   a probe support;
   first and second right angle wedge members each having a short base, a long base, and an inclined side;
   said first and second right angle wedge members having their short bases mounted on said probe support so that the said long bases face each other; and
   an isosceles wedge having its base mounted on said probe support and having two inclined sides both of which are perpendicular to said long bases of said first and second right angle wedge members.

2. A gas probe according to claim 1 wherein the long base of each of said right angle wedge member contains a window therein; and each of said right angle wedge members is adapted to contain optical means to measure the supersonic gas temperature.

3. A gas probe according to claim 1 wherein each right angle wedge member contains means to measure the supersonic gas temperature.

4. A gas stream sampling probe comprising:
   a probe support;
   first and second wedge shaped means positioned on said probe support for isolating a segment of gas from said gas stream whereby said isolated segment will flow unobstructedly between said first and second wedge shaped means;
   sensing means situated in and operative between said first and second wedge shaped means; and
   a third wedge shaped means positioned on said probe support between said first and second wedge shaped means downstream of said sensing means for diverting said isolated gas segment.

References Cited
FOREIGN PATENTS
1,029,522 5/1966 Great Britain.

LOUIS R. PRINCE, Primary Examiner
D. E. CORR, Assistant Examiner

U.S. Cl. X.R.
73—355, 421.5